United States Patent
Langbein et al.

(10) Patent No.: US 11,160,646 B2
(45) Date of Patent: Nov. 2, 2021

(54) ROOT CANAL APEX LOCATOR

(71) Applicant: DENTSPLY SIRONA Inc., York, PA (US)

(72) Inventors: Silvio Langbein, Finsing (DE); Markus F. Herrmann, Grossdingharting (DE)

(73) Assignee: DENTSPLY SIRONA Inc., York, PA (US)

( * ) Notice: Subject to any disclaimer, the term of this patent is extended or adjusted under 35 U.S.C. 154(b) by 0 days.

(21) Appl. No.: 16/107,194

(22) Filed: Aug. 21, 2018

(65) Prior Publication Data

US 2019/0053884 A1    Feb. 21, 2019

Related U.S. Application Data

(60) Provisional application No. 62/548,063, filed on Aug. 21, 2017.

(51) Int. Cl.
| A61C 19/04 | (2006.01) |
| A61C 1/08 | (2006.01) |
| A61C 5/44 | (2017.01) |

(52) U.S. Cl.
CPC ............ *A61C 19/042* (2013.01); *A61C 1/082* (2013.01); *A61C 5/44* (2017.02); *A61C 19/041* (2013.01)

(58) Field of Classification Search
CPC ....... A61C 19/041; A61C 19/042; A61C 5/44; A61C 19/04; A61C 5/42
See application file for complete search history.

(56) References Cited

U.S. PATENT DOCUMENTS

| 3,660,901 | A | | 5/1972 | Inoue |
| 3,753,434 | A | | 8/1973 | Pike |
| 3,894,532 | A | | 7/1975 | Morey |
| 3,901,216 | A | | 8/1975 | Felger |
| 3,916,529 | A | | 11/1975 | Mousseau |
| 3,993,044 | A | | 11/1976 | McGuffin |
| 4,295,830 | A | * | 10/1981 | Uchida ..................... A61C 1/12 433/115 |
| 6,425,875 | B1 | | 7/2002 | Reifman |
| 6,968,229 | B2 | | 11/2005 | Siemons |
| 7,628,613 | B2 | * | 12/2009 | Becker .................... A61C 19/04 433/126 |
| 2003/0064347 | A1 | * | 4/2003 | Ahani ...................... A61C 5/42 433/102 |

(Continued)

FOREIGN PATENT DOCUMENTS

| JP | 2013-66787 A | * | 4/2013 | ........... A61C 19/042 |
| JP | 2013066787 A | | 4/2013 | |

(Continued)

OTHER PUBLICATIONS

International Search Report; PCT/US2018/047302; Nov. 2, 2018 (completed); dated Nov. 15, 2018.

(Continued)

*Primary Examiner* — Jacqueline T Johanas
*Assistant Examiner* — Shannel Nicole Belk
(74) *Attorney, Agent, or Firm* — Dentsply Sirona Inc.

(57) ABSTRACT

An apex locator system constructed to enable visualization of an apex location at a vicinity of the mouth of a patient and more specifically on a lip clip, hand file and/or file clip of the apex locator system.

16 Claims, 8 Drawing Sheets

(56) References Cited

U.S. PATENT DOCUMENTS

| | | | |
|---|---|---|---|
| 2004/0019291 A1* | 1/2004 | Thacker | A61C 19/041 600/547 |
| 2005/0058962 A1 | 3/2005 | Siemons | |
| 2006/0154199 A1 | 7/2006 | Maxwell | |
| 2007/0160959 A1* | 7/2007 | Cammisa | A61C 5/42 433/224 |
| 2008/0187880 A1* | 8/2008 | Becker | A61C 19/041 433/25 |
| 2008/0241783 A1 | 10/2008 | Yamashita | |
| 2008/0261167 A1* | 10/2008 | Maitre | A61C 19/041 433/27 |
| 2009/0053666 A1 | 2/2009 | Buchanan | |
| 2011/0300512 A1* | 12/2011 | Becker | A61C 19/041 433/224 |
| 2019/0038014 A1* | 2/2019 | Greer, Jr. | A46B 15/0012 |
| 2019/0053884 A1* | 2/2019 | Langbein | A61C 5/44 |
| 2019/0117335 A1* | 4/2019 | Langbein | A61C 5/42 |
| 2019/0331573 A1* | 10/2019 | Earthman | A61B 5/4533 |

FOREIGN PATENT DOCUMENTS

| | | | | |
|---|---|---|---|---|
| JP | 5551283 B2 * | 7/2014 | | A61C 19/042 |
| KR | 100956678 B1 | 5/2010 | | |
| KR | 101712574 B1 | 3/2017 | | |

OTHER PUBLICATIONS

International Preliminary Report on Patentability; PCT/US2018/047302; Nov. 2, 2018 (completed); dated Nov. 15, 2018.
Written Opinion of the International Searching Authority; PCT/US2018/047302; Nov. 2, 2018 (completed); dated Nov. 15, 2018.

* cited by examiner

ROOT CANAL APEX LOCATOR

RELATED APPLICATIONS

This application is a non-provisional patent application of U.S. Provisional Patent Application No. 62/548,063 which is hereby incorporated by reference in its entirety.

FIELD OF THE INVENTION

The present invention relates generally to apex locators and more specifically it relates to an apex position visualization system for a device constructed to enable visualization of an apex location at the vicinity of the mouth of a patient and more specifically on the lip clip, file clip and/or hand file of an apex locator system.

BACKGROUND OF THE INVENTION

In performing a root canal operation, it is important for a dentist to accurately determine the length of the root canal when removing pulp therefrom and inserting a filling material therein. The interior of a root is removed with a dental probe, such as a reamer or file, prior to filling the root with replacement material. If all the root material not completely removed from the root prior to filling with replacement material, leftover root material can retard healing and even act as a focus for infection. On the other hand, if the probe is entered too deeply in the root canal, the probe penetrates the jaw tissue and causes swelling and unnecessary trauma to the patient. Moreover it is advantageous that a visualization of the length of the root canal be in close proximity to the dental area of the patient such that the dentist can conduct the root canal treatment quickly and seamlessly without having to stop intermittently.

US Publication No. 2008/0241783 discloses a handpiece with an integral apex locator which enables on-line measurement of the apex during treatment.

US Publication No. 2006/0154199 A1 discloses is an electronic apex locator that has a wireless connection to a data display unit. It is hereby incorporated by reference for background purposes.

Various instruments have been devised in the past for measuring probe penetration in a root canal, as evidenced by the disclosures of U.S. Pat. Nos. 6,968,229; 6,425,875; 3,916,529; 3,993,044; 3,753,434; 3,894,532; 3,660,901; and, 3,901,216.

However the visualization of the apex position is traditionally not in a convenient area. Moreover dentists normally use a microscope of microscope glass during root canal treatment making it difficult to read a display unit that shows the progression of a hand file through a root canal.

SUMMARY OF THE INVENTION

Existing limitations associated with the foregoing, as well as other limitations, may be overcome by an apex locator for determining the location of the apex of a patient's root, said apex locator including an advancement indicator having a controller and a light source, the advancement indicator constructed to display a plurality of light colors, said plurality of colors being configured to show the advancement of the hand file through the patient's root, and said advancement indicator being connected to one or more of a member selected from the group consisting of a lip clip, a hand file, and a file clip such that the location of the apex is visualized at a vicinity of a mouth of the patient.

In an aspect herein, the present invention may provide a dental apex locator for determining the location of the apex of a patient's root, comprising: a base having a power source; a lip clip connected to the base and adapted for grounding the patient; a hand file adapted for advancing through the root of the patient; and/or a file clip; the dental apex locator further including an advancement indicator having a controller and a light source, the advancement indicator constructed to display a plurality of light colors, said plurality of colors being configured to show the advancement of the hand file through the patient's root, and wherein said advancement indicator is connected to one or more of a member selected from the group consisting of the lip clip, the hand file, and the file clip such that the location of the apex is visualized at a vicinity of a mouth of the patient.

In another aspect herein, the method may further comprise one or more of the apex locators (i) wherein the advancement indicator includes a transparent portion constructed to be illuminated by said light source, (ii) wherein the hand file is a probe module and is directly connected to the base through, (iii) wherein the light source is an RGB LED (iv) wherein the advancement indicator is constructed to communicate wirelessly with the base, (v) wherein the advancement indicator is integrally connected to the one or more members, (vi) wherein the advancement indicator is detachably connected to the one or more members, (vii) wherein a communication path between the one or more members and the base is through a cable, (viii) wherein a communication path between the one or more members and the base is through a wireless connection, and (ix) wherein a communication path between the hand file clip and the hand file is through induction.

The invention relates to an apex locator including a lip clip, a hand file and/or a file clip, (the lip clip, hand file and file clip hereinafter referred to as member/s) and an apex locator base wherein members may be in communication with or may be powered by the base, said communication being wireless and/or through a wired means such as a cable. The lip clip or file clip or hand file may further be modified to include a root canal advancement indicator which may be integrated in the lip clip or file clip or hand file or may be separately attached thereto. The hand file may be indirectly connected to the base through a file clip or may be directly connected to the base (as a probe module) through a direct wired or wireless connection. The file clip may also be connected to the base through a wired or wireless connection. The base may comprise an electronic module having a power source, an impedance analyzer circuit and communication means such as a radio frequency transmitter (not shown) for transmitting data/radio frequencies to a controller of the advancement indicator.

An object is to provide an apex position visualization system for a device constructed to enable visualization of an apex location at the vicinity of the mouth of a patient and more specifically on the lip clip, file clip and/or hand file of an apex locator system.

Another object is to provide an Apex Position Visualization System that comprises a hand file wherein a light source such as an RGB LED (Red-Green-Blue Light Emitting Diode) is embedded in a preferably transparent handle of the hand file to indicate stages of advancement of the file of the hand file through a root canal of a patient. It will be appreciated by one of skill in the art that different light sources may be used, with an RGB LED being a preferred light source. Moreover other indicators such as an audible sound alarm may be combined with the RGB LED to indicate the advancement of the hand file through the root canal.

Another object is to provide an Apex Position Visualization System that comprises a lip clip wherein a light source such as an RGB LED may be embedded in a transparent portion of the lip clip to indicate stages of advancement of the file of a hand file through a root canal of a patient.

Another object is to provide an Apex Position Visualization System that comprises a lip clip with an advancement indicator wherein an LED is integrated into a connector of the lip clip and the lip clip is connected to a base by a cable.

Another object is to provide an Apex Position Visualization System that comprises a wireless lip clip with an advancement indicator wherein an LED and logic are integrated into the lip clip and the lip clip connects wirelessly with a base.

Another object is to provide an Apex Position Visualization System that comprises a hand file with an advancement indicator wherein an RGB LED is integrated into the hand file to indicate stages of advancement of the file of a hand file through a root canal of a patient.

Another object is to provide an Apex Position Visualization System wherein the hand file comprises an advancement indicator as a separate attachment that may be detachably removed from the hand file and wherein the indicator may be powered by a cable connection to the base.

Another object is to provide an Apex Position Visualization System wherein the hand file comprises an advancement indicator as a separate attachment that may be detachably removed from the hand file and wherein the indicator may be powered by a battery. The battery may be rechargeable or replaceable.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 6:
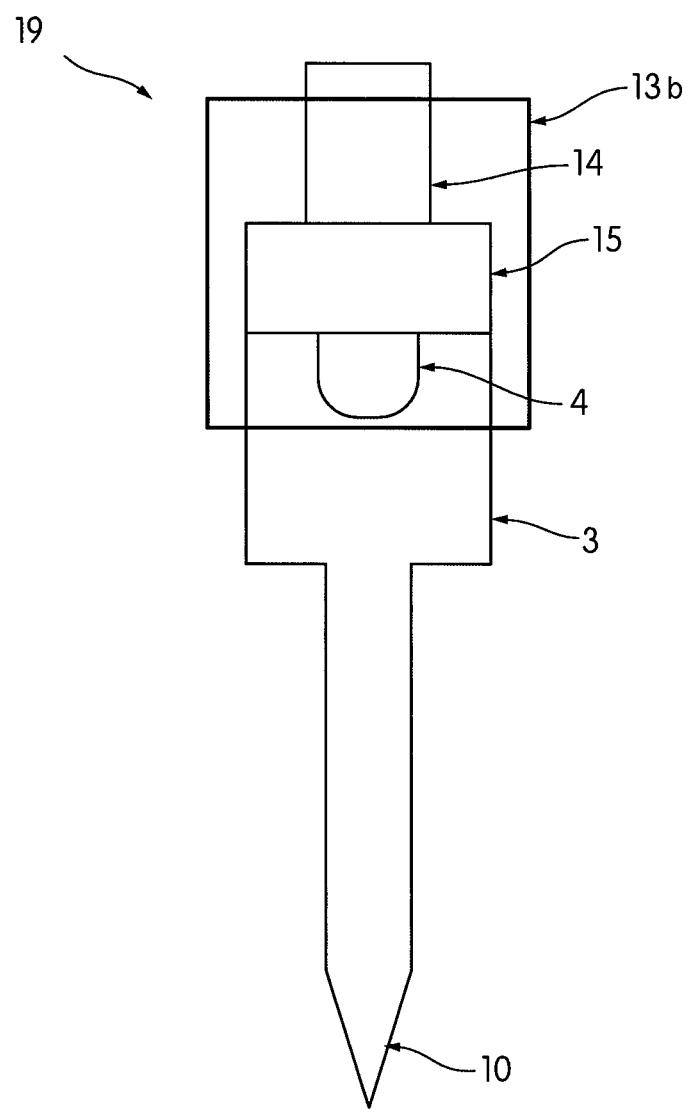
FIG. 6 is a front view of another embodiment of the present invention.

Turning now descriptively to the drawings, in which similar reference characters denote similar elements throughout the several views, the figures illustrate a lip clip, a file clamp, an apex locator base and a hand file. The lip clip, file clip and hand file may be in communication with or may be powered by the base. The base may be a table top unit or an instrument such as a handpiece/rotary drill or otherwise. Such communication may be wireless or may be through a cable. The lip clip or file clip or hand file may further be modified to include a root canal advancement indicator 13 which may be integrated as an integrated advancement indicator in the lip clip or file clip or hand file or may be separately attached as a removable advancement indicator 13b (as shown in FIG. 6). The hand file may be indirectly connected to the base through a file clip or may be directly connected to the base through direct wires. The base may comprise an electronic module having a power source, an impedance analyzer circuit and a radio frequency transmitter (not shown) for transmitting radio frequencies to a controller of the advancement indicator 13.

Figure 1:
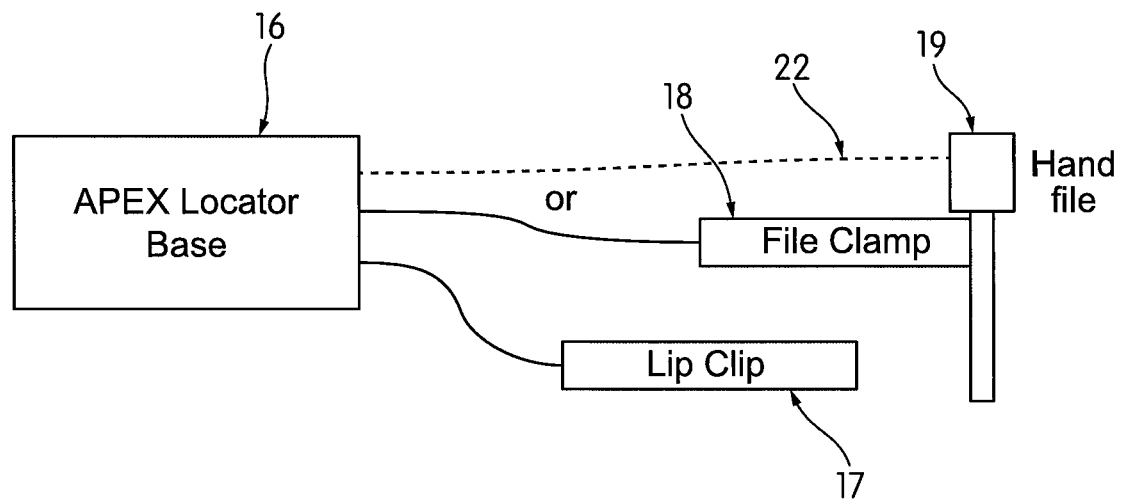
FIG. 1 is a block diagram illustrating the overall system of the present invention.
Figure 4:
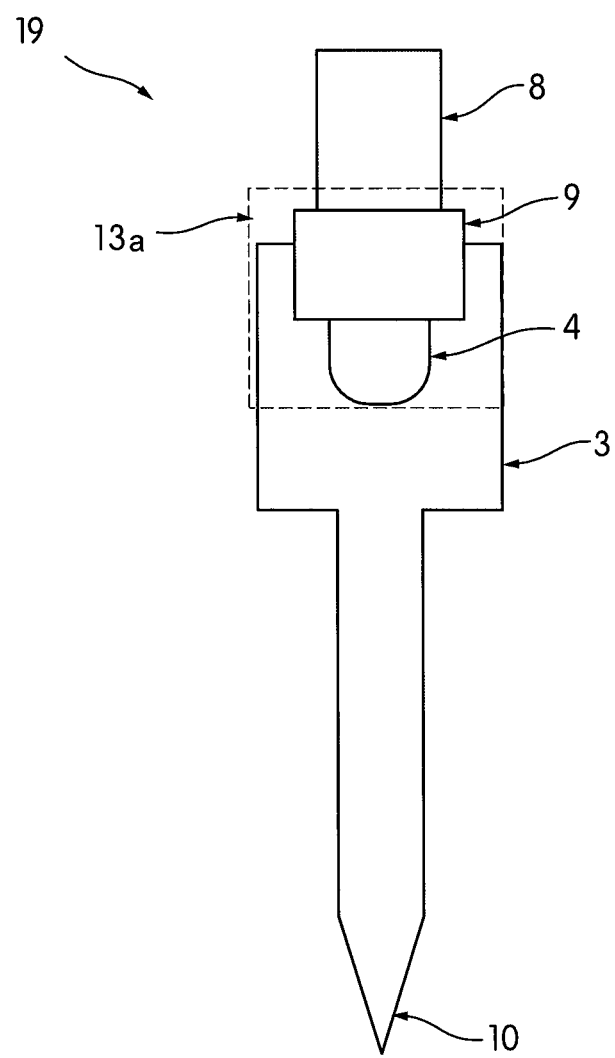
FIG. 4 is a front view of an embodiment of the present invention.

FIG. 1 illustrates an apex locator system comprising a base 16 with a lip clip 17 and a file clip 18 in communication with the base 16. The system may also include a hand file 19. The hand file may have an advancement indicator 13 in the form of a transparent plastic part 3 with an embedded lighting device/light source which may be an RGB LED 4 as shown in FIG. 4. A communication path between the base 16 and a hand file or probe may be realized by direct wires 22, which could preclude the need for a file clip 18. The communication path between the hand file 19 and the base 16 may also be realized by a multi contact file clip 18 or a combination of direct wires 22 and a multi contact file clip 18. Additionally, the hand file may be powered by an internal battery such that communication between the hand file 19 and the base 16 may be achieved by a wireless connection to the base 16. The file clip 18 may also be inductively coupled to the hand file 19.

Figure 2:
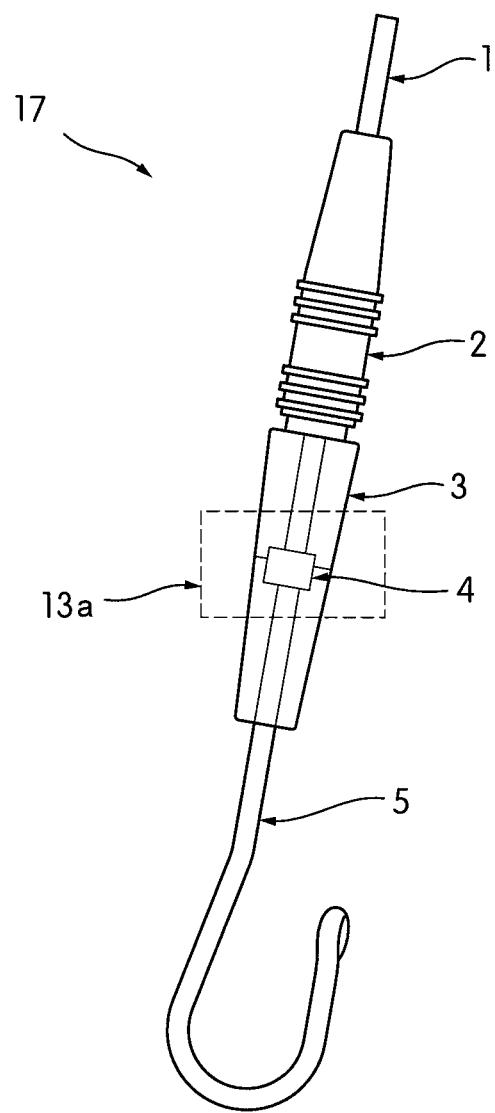
FIG. 2 is a perspective view of an embodiment of the present invention.

FIG. 2 illustrates an embodiment of the disclosure showing a lip clip 17 comprising an advancement indicator 13, a tip 5 and a connector 2. A cable 1 from the apex locator base 16 connects an RGB LED 4 of the advancement indicator 13 and a tip of the lip clip 5 to the base 16. The RGB LED 4 illuminates a transparent plastic part 3 to indicate the position of the hand file in the root canal. The transparent plastic part may be attached with a crimp connection, by screwing or by similar techniques. In use, the tip 5 of the lip may physically engage a patient's lip (not shown) to electrically ground the patient.

Figure 3:
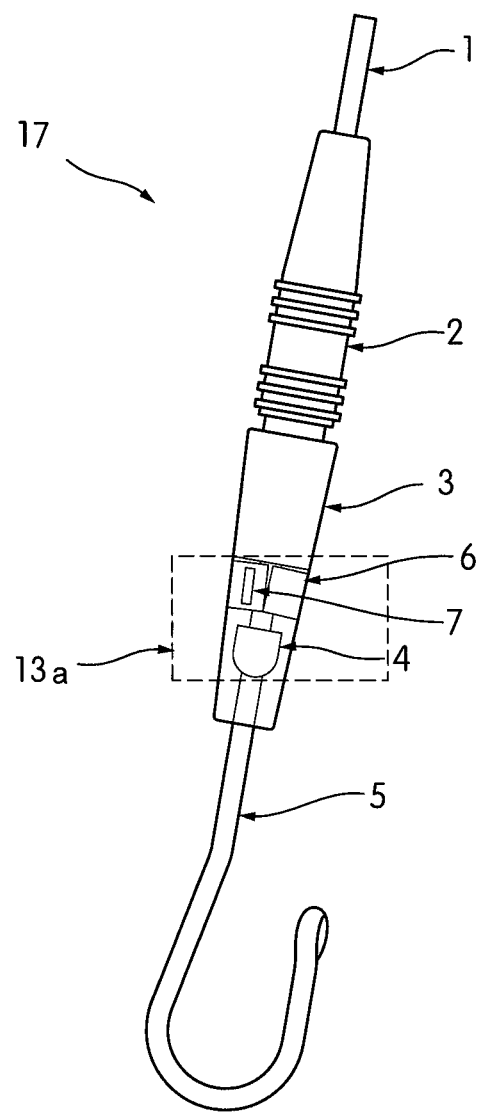
FIG. 3 is a perspective view of another embodiment of the present invention.

FIG. 3 illustrates an embodiment of disclosure showing a lip clip 17 with an advancement indicator 13 wherein the lip clip 17 comprises a wireless chip with an LED controller 7 to receive data wirelessly, for example, over radio frequencies to control the LED 4 according to the position of the hand file in the root canal. A battery 6, which may be rechargeable or replaceable may be used as a power source. Further a cable 1, from the apex locator base, may be used in conjunction with the tip 5 to electrically ground the patient.

FIG. 4 shows a hand file comprising an advancement indicator 13, a cable 8 and a tip 10 wherein the advancement indicator 13 indicates the position of the tip 10 in the root canal. A connector 9 may electrically connect the metal tip 10 of the hand file with the base 16 of the apex locator system. The connector may also connect the RGB LED 4 with the base 16 through the cable 8. A transparent handle 3 of the hand file may be illuminated by the RGB LED 4 to indicate the advancement of the tip 10 through the root canal. The tip 10 may be made of electrically conductive material. The file may be hollow or substantially solid, and may be formed of plastic with metallic portions electrically connected between the tip 10 and the connector 9 or the file may be formed completely of metallic material/s.

Figure 5:
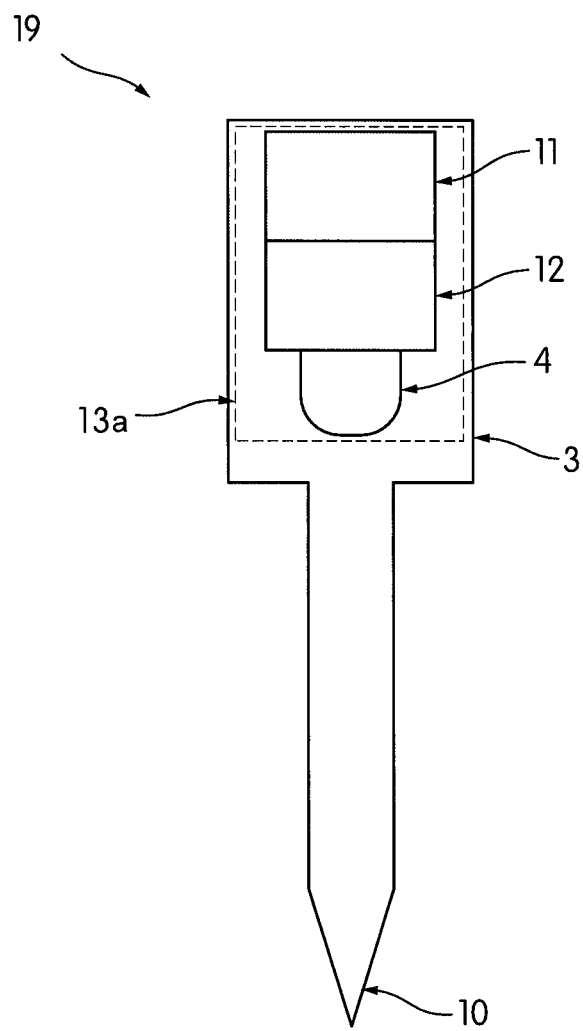
FIG. 5 is a front view of another embodiment of the present invention.

FIG. 5 illustrates a hand file 19 with an advancement indicator 13 wherein the hand file operates wirelessly. A battery 11 may be housed in the hand file 19 wherein a wireless chip and LED Controller 12 receive data over radio frequencies to control the LED 4 according to the position of the tip 10 in the root canal of a patient. A transparent handle 3 of the hand file 19 may be illuminated by the RGB LED 4 to indicate advancement of the tip 10 through the root canal of a patient.

FIG. 6 shows a hand file 19 with a removable advancement indicator 13b wherein the removable advancement indicator 13b is a separate attachment which may be removably connected to the hand file 19. Said separate attachment may comprise a cable 14 from the base 16 of the apex locator system, an LED controller 15 to control the color of the RGB LED 4 based on the position of the tip 10 in the root canal, an RGB LED 4. The separate attachment may be attached by crimp connection, screwing or the like. The separate attachment may also further comprise a transparent handle 3 or a section of a transparent handle which may be illuminated by the RGB LED 4 to indicate advancement of the tip 10 through the root canal.

Figure 7:
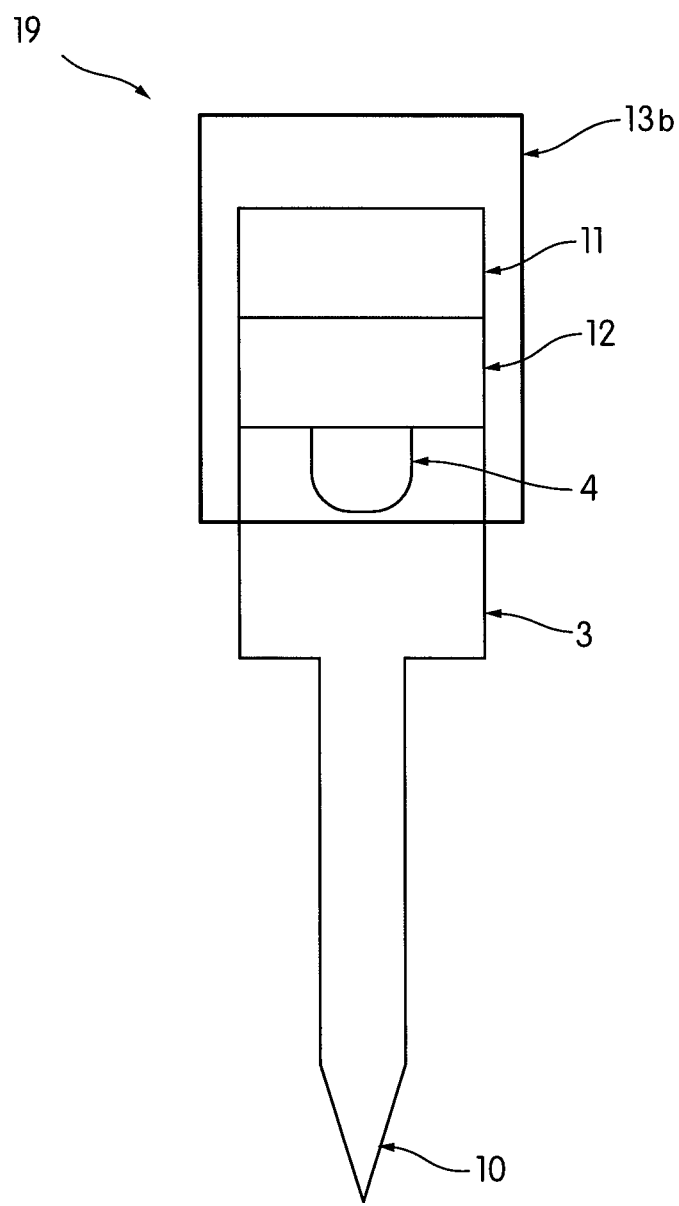
FIG. 7 is a front view of another embodiment of the present invention.

FIG. 7 illustrates a hand file 19 with a removable advancement indicator 13b wherein the removable advancement indicator 13b is a separate attachment without a cable, said separate attachment capable of being removably connected with the handle of the hand file. The attachment may also be connected with a crimp connection or by screwing. It may further comprise a battery 11 which may be rechargeable, for example, during sterilization. The battery 11 may also be replaceable. The attachment 13 may also comprise a wireless chip with an LED Controller 12 as well as an RGB LED 4. The wireless chip with an LED Controller 12 may receive data over radio frequencies to control the color of the LED 4.

Figure 8:
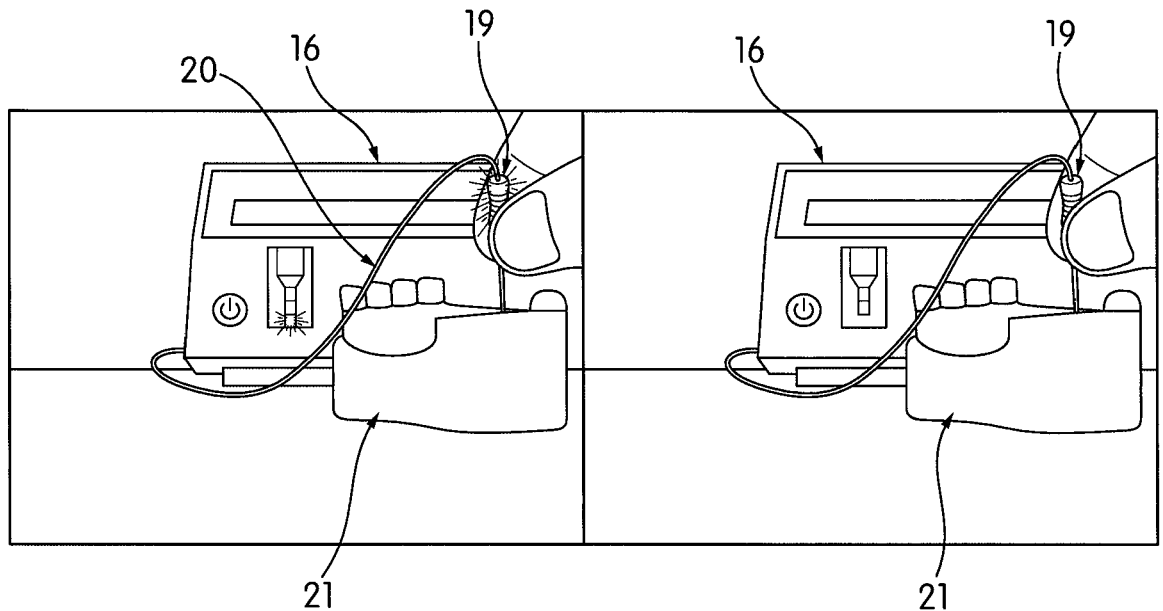
FIG. 8 is a front view of the apex locator system in use.

FIG. 8 illustrates the operation of the apex locator system. A hand file or probe 19 comprising an advancement indicator 13 may be used. After preparing the root canal, the tip 10 of the hand file may be inserted into the root canal and the position of the tip may be measured and indicated using various colors of the LED 4. The colors may for example show the canal range to be the color of the LED. At the start of the apex measurement the LED may be off. When the tip reaches the coronal area, the LED may be blue. At the apical constriction, the LED may blink green. In between the apical constriction and the apical foramen, the LED may be orange. At the apical foramen, the LED may become RED. For over-instrumentation, the LED may be red.

Figure 9:
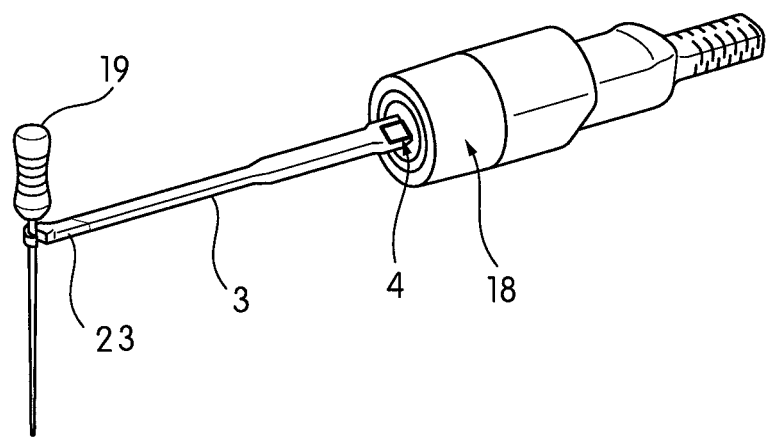
FIG. 9 is a perspective view of another embodiment of the present invention.

FIG. 9 illustrates yet another embodiment of the present invention wherein the file clip 18 may have an advancement indicator 13. Herein, the file clip 18 may have a light source such as an RGB LED 4 and may be connected by a connection means such as a cable 1 to the apex locator base 16. The file clip 18 and may be engagably connected to the hand file 19 for root canal measurement. The light source of the file clip 18 may be configured with a plurality of light colors to illuminate a preferably transparent plastic part 3 of the file clip 18. Said preferably transparent part 3 may be cover or be overmolded around a metallic part 23 through which an electrical connection to the hand file 19 and the base 16 may be established. The progression of the hand file 19 through the root canal may be indicated by the changing colors of the light source, said changing colors corresponding to a depth of the root canal reached such that quick and efficient measurement may be achieved in the vicinity of the mouth of the patient.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

What is claimed is:

1. A dental apex locator for determining the location of the apex of a patient's root, comprising:
   a base having a power source;
   a lip clip connected to the base and adapted for grounding the patient;
   a hand file adapted for advancing through the root of the patient; and
   optionally, a file clip for connecting the hand file to the base;
   the dental apex locator further including an advancement indicator having transparent part, a light source and a controller configured to receive communication about a location of the hand file in the patient's root in order to control the light source, the light source and the controller are disposed inside the transparent part, the transparent part encircles the controller and the light source and the transparent part is configured to be illuminated by the light source along its elongated length to indicate advancement of said hand file through the patient's root based on a display of a plurality of light colors that correspond to said advancement of the hand file through the patient's root,
   wherein the advancement indicator is constructed to communicate wirelessly with the base, and
   wherein said advancement indicator is integrated into a body of one member selected from the group consisting of the lip clip, the hand file and the file clip such that the location of the apex is visualized at a vicinity of a mouth of the patient.

2. The dental apex locator according to claim 1, wherein the hand file is a probe module and is directly connected to the base through a wired connection.

3. The dental apex locator according to claim 1, wherein the light source is an RGB LED.

4. The dental apex locator of claim 1, wherein a communication path between the one or more members and the base is through a cable.

5. The dental apex locator of claim 1, wherein a communication path between the one or more members and the base is through a wireless connection.

6. The dental apex locator of claim 1, wherein a communication path between the file clip and the hand file is through induction.

7. The dental apex locator of claim 1, wherein said advancement indicator is integrated into the body of the hand file.

8. The dental apex locator of claim 1, wherein said advancement indicator is integrated into the body of the lip clip.

9. The dental apex locator of claim 1, wherein said advancement indicator is powered by an internal battery.

10. A dental apex locator for determining the location of the apex of a patient's root, comprising:
a base having a power source;
a lip dip connected to the base and adapted for grounding the patient;
a hand file adapted for advancing through the root of the patient; and
optionally, a file clip for connecting the hand file to the base;
the dental apex locator further including an advancement indicator having transparent part, a light source and a controller configured to receive communication about a location of the hand file in the patient's root in order to control the light source, the light source and the controller are disposed inside the transparent part, the transparent part encircles the controller and the light source and the transparent part is configured to be illuminated by the light source along its elongated length to indicate advancement of said hand file through the patient's root based on a display of a plurality of light colors that correspond to said advancement of said hand file through the patient's root,
wherein the advancement indicator is constructed to communicate wirelessly with the base, and
wherein said advancement indicator is removably attached onto a member selected from the group consisting of the lip clip, the hand file, the file clip, or a combination thereof such that the location of the apex is visualized at a vicinity of a mouth of the patient.

11. The dental apex locator of claim 10, wherein said advancement indicator is removably attached onto the hand file.

12. The dental apex locator of claim 10, wherein said advancement indicator is removably attached onto the lip clip.

13. The dental apex locator of claim 10, wherein said advancement indicator is removably attached onto the file clip.

14. A dental apex locator for determining the location of the apex of a patient's root, comprising:
a base having a power source;
a lip clip connected to the base and adapted for grounding the patient;
an optional file clip; and
a hand file adapted for advancing through the root of the patient, the hand file including an internal advancement indicator which comprises a transparent part, a light source and a controller configured to receive communication about a location of the hand file in the patient's root in order to control the light source, the light source and the controller are disposed inside the transparent part, which encircles the controller and the light source and which is configured to be illuminated by the light source along its elongated length to indicate advancement of said hand file through the patient's root based on a display of a plurality of light colors that correspond to said advancement of the hand file through the patient's root, and
wherein said internal advancement indicator of the hand file is constructed to be removably attached onto a handle of the hand file through a non-cable connection such that the location of the apex is visualized at a vicinity of a mouth of the patient.

15. The dental apex locator of claim 14, wherein said non-cable connection is a screw connection.

16. The dental apex locator of claim 14, wherein said non-cable connection is a crimp connection.

* * * * *